UNITED STATES PATENT OFFICE.

HENRY W. JOHNS, OF NEW YORK, N. Y.

IMPROVEMENT IN COMPOUNDS FOR ROOFING AND OTHER PURPOSES.

Specification forming part of Letters Patent No. 76,773, dated April 14, 1868; reissue No. 5,950, dated June 30, 1874; application filed May 1, 1874.

DIVISION C.

*To all whom it may concern:*

Be it known that I, HENRY W. JOHNS, of the city, county, and State of New York, have invented a new and useful Composition of Matter for Roofs and other Surfaces, of which the following is a specification:

My said invention, which relates to an improved cement, mastic, or paint for coating roofs and other surfaces, consists in compounding asbestus, which is the characteristic ingredient, with an adhesive substance—such as dissolved india-rubber, or silicate, or glue, or other like adhesive substance, and pigments, when special colors are required or desired.

The asbestus may be reduced to a powder or fiber by any of the well-known methods, and after being properly prepared it is mixed with india-rubber which has been dissolved by any of its known solvents. I have obtained good results by using these in the proportion of six pounds of asbestus to three pounds of dissolved india-rubber. When glue dissolved in water is used instead of dissolved india-rubber, six pounds of asbestus to two pounds of dissolved glue will produce a good result; and when silicate is used instead of india-rubber or glue, I prefer to use the silicate of soda, in the proportion of six pounds of asbestus to eight pounds of silicate of soda. But these proportions may be varied at pleasure.

The density of the compound will, however, depend in a great measure upon the degree of fluidity of the dissolved india-rubber, or equivalent, which may be used.

To give more body to the compound above described I combine therewith either marble-dust, sand, clay, lime, or other equivalent substances, in such proportion as may be deemed suitable, in view of the purpose to which such coating is to applied.

What I claim as my invention, and desire to secure by Letters Patent, is—

1. The compound of asbestus and india-rubber, substantially as described, as a cement, mastic, or paint, as set forth.

2. The compound of asbestus and india-rubber, in combination with marble-dust, for giving body to the compound, substantially as set forth.

HENRY W. JOHNS.

Witnesses:

T. W. BAXTER,

C. H. PATRICK.